US012561582B2

(12) United States Patent
Fanini et al.

(10) Patent No.: US 12,561,582 B2
(45) Date of Patent: Feb. 24, 2026

(54) MULTI-PHASE CHARACTERIZATION USING DATA FUSION FROM MULTIVARIATE SENSORS

(71) Applicant: Baker Hughes Oilfield Operations LLC, Houston, TX (US)

(72) Inventors: Otto Fanini, Houston, TX (US); Sandip Maity, Manama (BH); Daniel Ratigan, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 1041 days.

(21) Appl. No.: 17/130,452

(22) Filed: Dec. 22, 2020

(65) Prior Publication Data

US 2021/0201178 A1 Jul. 1, 2021

Related U.S. Application Data

(60) Provisional application No. 62/953,788, filed on Dec. 26, 2019.

(51) Int. Cl.
| | |
|---|---|
| *G06N 5/04* | (2023.01) |
| *E21B 49/08* | (2006.01) |
| *G06F 30/20* | (2020.01) |
| *G06F 111/10* | (2020.01) |
| *G06N 20/00* | (2019.01) |

(52) U.S. Cl.
CPC .............. *G06N 5/04* (2013.01); *E21B 49/08* (2013.01); *G06N 20/00* (2019.01); *G06F 30/20* (2020.01); *G06F 2111/10* (2020.01)

(58) Field of Classification Search
CPC ............................................... E21B 49/08–088
See application file for complete search history.

(56) References Cited

U.S. PATENT DOCUMENTS

| | | | |
|---|---|---|---|
| 2004/0026076 A1* | 2/2004 | Goodwin | G01N 33/2823 166/66.6 |
| 2007/0079962 A1* | 4/2007 | Zazovsky | E21B 49/08 166/264 |
| 2007/0119244 A1* | 5/2007 | Goodwin | E21B 47/10 73/152.28 |
| 2010/0192684 A1 | 8/2010 | Wu | |

(Continued)

OTHER PUBLICATIONS

International Search Report and Written Opinion mailed Mar. 15, 2021 in corresponding PCT Application No. PCT/US2020/066756.

*Primary Examiner* — Kristyn A Hall
(74) *Attorney, Agent, or Firm* — Hogan Lovells US LLP

(57) ABSTRACT

A method for determining a wellbore fluid phase includes receiving, from a first sensor, first fluid data for a fluid flowing through a wellbore. The method also includes receiving, from a second sensor, second fluid data for the fluid. The method further includes determining, based at least in part on the first fluid data, a first fluid property. The method also includes determining, based at least in part on the second fluid data, a second fluid property. The method further includes determining a relationship between the first fluid property and the second fluid property, the relationship based at least in part on respective evaluations of the first fluid property with respect to a first threshold and the second fluid property with respect to a second threshold. The method includes determining, based at least in part on the relationship, a phase of the fluid.

14 Claims, 15 Drawing Sheets

(56)  References Cited

U.S. PATENT DOCUMENTS

| | | | |
|---|---|---|---|
| 2011/0005745 A1* | 1/2011 | Goodwin ................ | E21B 49/10 |
| | | | 166/250.01 |
| 2013/0100453 A1 | 4/2013 | Harrison | |
| 2013/0110401 A1 | 5/2013 | Hsu | |
| 2013/0346040 A1* | 12/2013 | Morales German .... | E21B 43/00 |
| | | | 703/2 |
| 2014/0090451 A1 | 4/2014 | Surman | |
| 2014/0102695 A1 | 4/2014 | Adil et al. | |
| 2015/0136962 A1 | 5/2015 | Pomerantz | |
| 2015/0377776 A1 | 12/2015 | Xie | |
| 2016/0033468 A1 | 2/2016 | Shanks | |
| 2017/0045492 A1 | 2/2017 | Surman | |
| 2017/0314341 A1 | 11/2017 | Lovell | |
| 2018/0371905 A1* | 12/2018 | Chen .................... | G01V 11/002 |
| 2019/0003993 A1 | 1/2019 | Hornung | |
| 2019/0063215 A1 | 2/2019 | Dai | |
| 2019/0120049 A1* | 4/2019 | Chen ....................... | E21B 47/12 |
| 2020/0265615 A1* | 8/2020 | Di Santo ................ | E21B 49/00 |

* cited by examiner

| FLUORESCENCE | GAS | WATER | OIL | | GAS | WATER | OIL |
|---|---|---|---|---|---|---|---|
| R1, $\lambda$1 | N | N | Y | | 0 | 0 | 1 |
| R1, $\lambda$2 | Y | .5I | N | | IF R1($\lambda$1, $\lambda$2) IS 0.9$I_0$ AND Flou=0 THEN GAS | | |
| | Y | .5I | N | | | IF R1($\lambda$1, $\lambda$2) IS 1/2 OF GAS AND Flou=0 THEN WATER | |

FIG. 2

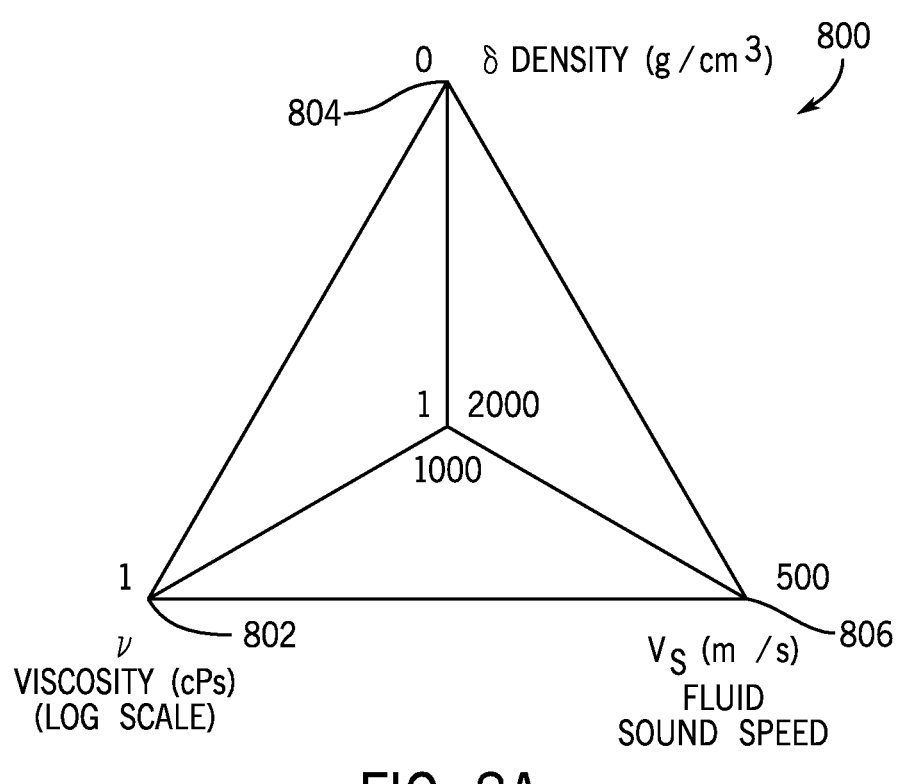
FIG. 8A
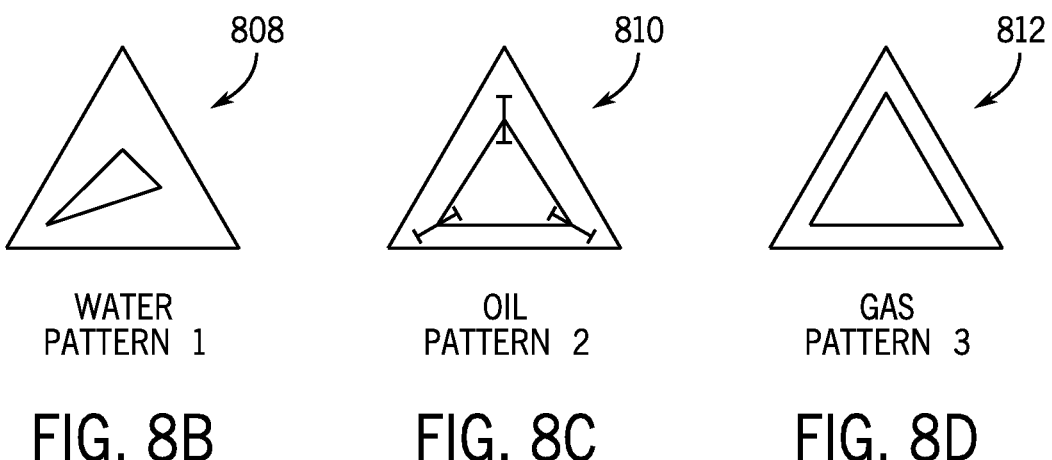
| WATER PATTERN 1 | OIL PATTERN 2 | GAS PATTERN 3 |
| :---: | :---: | :---: |
| FIG. 8B | FIG. 8C | FIG. 8D |

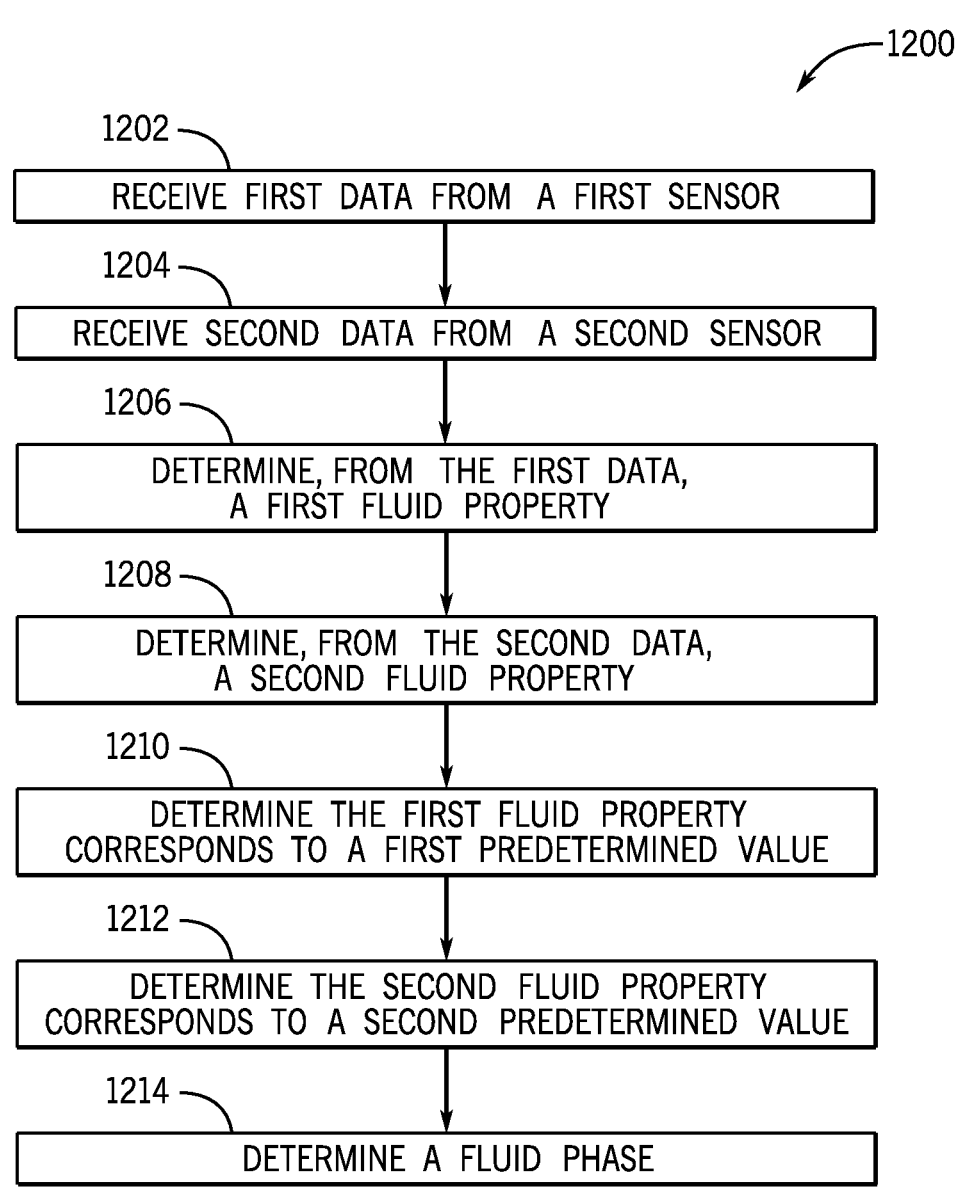

1200

1202 — RECEIVE FIRST DATA FROM A FIRST SENSOR

1204 — RECEIVE SECOND DATA FROM A SECOND SENSOR

1206 — DETERMINE, FROM THE FIRST DATA, A FIRST FLUID PROPERTY

1208 — DETERMINE, FROM THE SECOND DATA, A SECOND FLUID PROPERTY

1210 — DETERMINE THE FIRST FLUID PROPERTY CORRESPONDS TO A FIRST PREDETERMINED VALUE

1212 — DETERMINE THE SECOND FLUID PROPERTY CORRESPONDS TO A SECOND PREDETERMINED VALUE

1214 — DETERMINE A FLUID PHASE

FIG. 12

MULTI-PHASE CHARACTERIZATION USING DATA FUSION FROM MULTIVARIATE SENSORS

CROSS REFERENCE TO RELATED APPLICATIONS

This application claims priority to and the benefit of U.S. Provisional Patent Application No. 62/953,788, titled "MULTI-PHASE CHARACTERIZATION USING DATA FUSION FROM MULTIVARIATE SENSORS," filed Dec. 26, 2019, the full disclosure of which is hereby incorporated by reference in its entirety for all purposes.

BACKGROUND

1. Field of Disclosure

This disclosure relates in general to oil and gas tools, and in particular, to systems and methods for downhole measurements that may be utilized to determine wellbore composition characterizations.

2. Description of the Prior Art

In oil and gas production, it may be desirable to determine wellbore flow characteristics, such as a phase of the fluid flowing through the well. However, such a determination may be difficult to accomplish in real or near-real time. Furthermore, wellbore environments may be harsh, and as a result, certain analysis methods may not be sufficient for downhole use. For example, capacitance and resistance array sensors may not accurately determine flow characteristics in the well under certain wellbore conditions.

SUMMARY

Applicant recognized the problems noted above herein and conceived and developed embodiments of systems and methods, according to the present disclosure, for multiphase characterization.

In an embodiment, a method for determining a wellbore fluid phase includes receiving, from a first sensor, first fluid data for a fluid flowing through a wellbore. The method also includes receiving, from a second sensor, second fluid data for the fluid. The method further includes determining, based at least in part on the first fluid data, a first fluid property. The method also includes determining, based at least in part on the second fluid data, a second fluid property. The method further includes determining a relationship between the first fluid property and the second fluid property, the relationship based at least in part on respective evaluations of the first fluid property with respect to a first threshold and the second fluid property with respect to a second threshold. The method includes determining, based at least in part on the relationship, a phase of the fluid.

In an embodiment, a system for determining properties of a wellbore fluid includes a first sensor configured to determine a fluid property (e.g., determine a characterization of different types or phases or fluids such as a gas, an oil, water, or an emulsion), the first sensor corresponding to a resonator. The system also includes a second sensor configured to determine a second fluid property (e.g., an oil, water, and/or gas property), the first sensor corresponding to a first optical sensor operational at a first wavelength. The system further includes a third sensor configured to determine a third fluid property (e.g., an oil, water, and/or gas property), the second sensor corresponding to a second optical sensor operational at a second wavelength. The system also includes at least one processor and memory storing instructions that, when executed by the processor, cause the system to determine, based at least in part on the first fluid property, a fluid density. The instructions also cause the system to determine, based at least in part on one of the first sensor or the second sensor, a fluid fluorescence. The instructions further cause the system to determine, based at least in part on one of the first sensor or the second sensor, a fluid reflection. The instructions also cause the system to associate the fluid density with at least one of the fluid fluorescence or the reflected intensity from the sensor to determine a phase of the fluid.

In an embodiment, a method for determining a wellbore fluid phase includes receiving, from at least one sensor, fluid data for a fluid flowing through a wellbore. The method also includes determining, based at least in part on the fluid data, a plurality of fluid properties. The method further includes generating, based at least in part on the plurality of fluid properties, a visual pattern for the fluid. The method includes determining, based at least in part on a shape of the visual pattern, a fluid phase.

BRIEF DESCRIPTION OF THE DRAWINGS

The present technology will be better understood on reading the following detailed description of non-limiting embodiments thereof, and on examining the accompanying drawings, in which:

FIG. 2 is a graphical representation of an embodiment of a truth table for classifying flow, in accordance with embodiments of the present disclosure;

FIGS. 8A-8D are graphical representations of diagrams for classifying flow, in accordance with embodiments of the present disclosure;

FIG. 12 is a flow chart of an embodiment of a method for classifying a fluid phase, in accordance with embodiments of the present disclosure.

DETAILED DESCRIPTION

Figure 1:
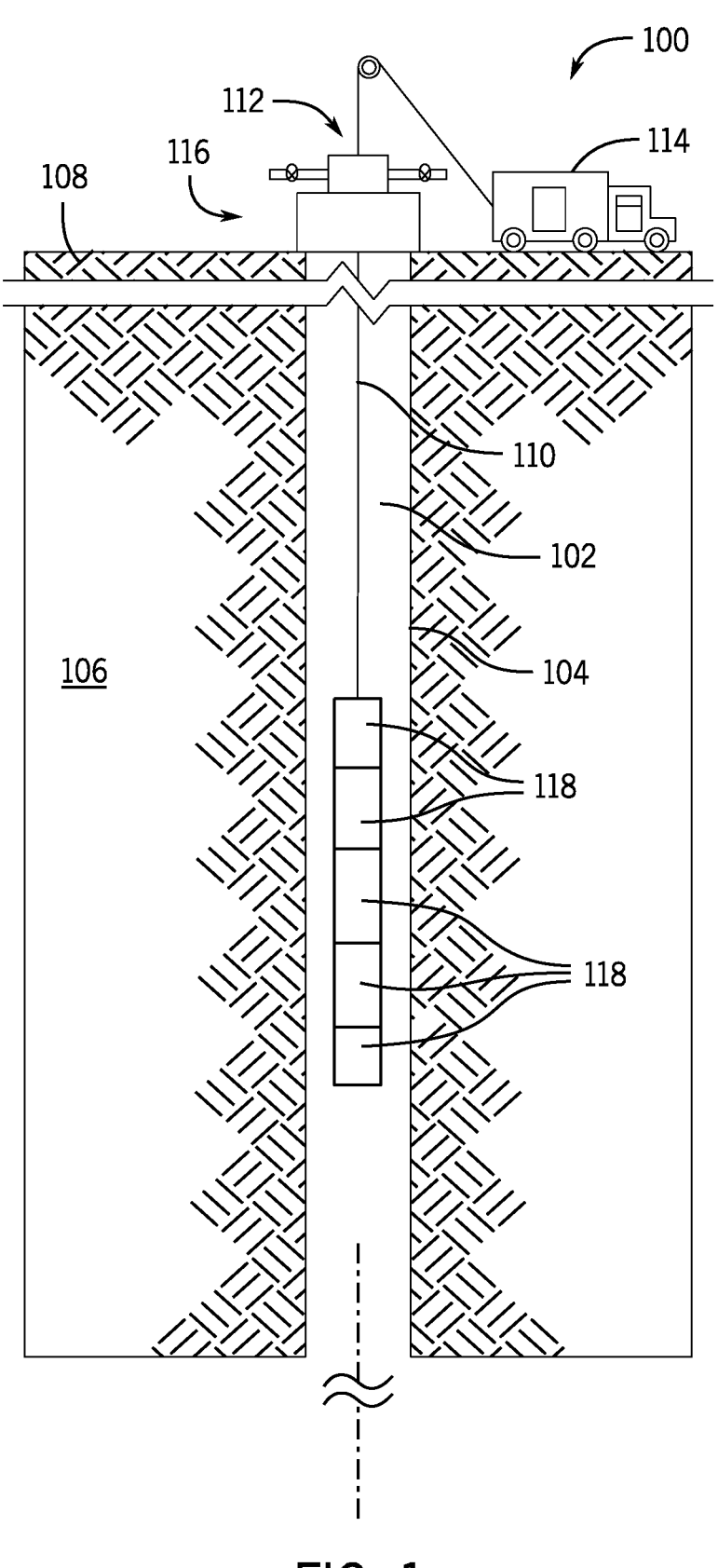
FIG. 1 is a cross-sectional side view of an embodiment of a wellbore system, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present disclosure are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed to a multi-sensing approach that utilizes one or more optical sensors in combination with a resonating device. In embodiments, a pair of optical sensors may utilize two or more different colors of light. The optical response from fluids flowing through the well may be characterized for each optical sensor. For example, reflection of light may vary by fluid type, which may have different refractive indexes or different optical sensor design (e.g., conical, biconical, etc.). However, combining information from the resonator (which may be operating from 40-100 kHz in embodiments, but not limited to that frequency range) may be useful for categorizing the fluid phases. Furthermore, it should be appreciated that other measurements may also be included to provide additional information for categorization.

Various embodiments illustrate systems and methods for performing wellbore phase categorization, which may be provided in-situ in real or near-real time. Embodiments of the present disclosure utilize information obtained from optical sensors (e.g., measurements based on fluid refractive indexes as well as fluorescence) in combination with information from a resonating device, which may be utilized to determine a resonance shift, a phase shift, and/or a quality factor (Q factor). In embodiments, information or properties obtained from one or more measurements may be utilized as a conditional input to determine a phase of the flow. For example, as will be described below, a density measurement obtained from the resonator may be utilized in combination with the optical measurements to determine a phase of the flow through the wellbore, which may further be utilized to determine onset of emulsion, among other characteristics.

FIG. 1 is a schematic cross-sectional view of an embodiment of a wellbore system 100 including a downhole tool 102 arranged within a wellbore 104 formed in a formation 106. The downhole tool 102 is lowered from a surface location 108 via a conveyance system, such as the illustrated wireline 110. In various embodiments, the electric wireline may transmit electric signals and/or energy from the surface location 108 into the wellbore, for example to provide operational power for the tool 102 and/or to transmit data, such as data obtained from sensors arranged on the tool 102. In various embodiments, the tool 102 may be utilized to perform downhole logging operations, such as an imaging tool, a resistivity tool, a nuclear magnetic resonance tool, or any other logging tool that may be used in a downhole environment. It should be appreciated that embodiments exist where the downhole tool 102 is deployed with any other type of conveyance means, including coiled tubing, pipes, cable, and slickline. That is, embodiments of the present disclosure may be utilized in other scenarios, such as measurement while drilling, production logging, and the like.

The wellbore system 100 includes a wellhead assembly 112, shown at an opening of the wellbore 104, to provide pressure control of the wellbore 104 and allow for passage of equipment into the wellbore 104, such as the cable 110 and the tool 102. In this example, the cable 110 is a wireline being spooled from a service truck 114. The wellhead assembly 112 may include a blowout preventer (BOP) 116 (e.g., pressure control device).

In various embodiments, the downhole tool 102 includes a number of segments 118, which may represent different devices or sensors utilized to obtain information from the downhole environment. By way of example only, one segment may relate to a nuclear detection tool that may include one or more radiation sources and detectors to receive signals corresponding to radiation emitted from the formation. The radiation may be naturally occurring or in response to interrogation from the source. The tools associated with these segments 118 may be utilized to determine one or more properties of the formation 106 and/or identify specific features of the wellbore, such as properties of the tubing and/or casing. As another example, the segments 118 may correspond to a downhole resonance tool and/or optical sensing tools that emit light.

In the illustrated embodiment, the tool 102 is deployed on the wireline 110 and may be transitioned through the wellbore 104 via gravity. While the illustrated wellbore 104 is shown as being substantially straight (e.g., straight up and down) it should be appreciated that wellbores may be deviated or have geometric differences along their length. Furthermore, the illustrated wellbore 104 does not include a casing, cement securing the casing to the formation 106, or a multi-barrier structure, as may be present in wellbores, such as subsea wellbores and/or older wellbores undergoing plugging and abandonment, but it should be appreciated that various embodiments may be utilized in wellbores with different configurations.

FIG. 2 illustrates a truth table 200 that may be utilized with embodiments of the present disclosure in order to identify a phase of a fluid flowing within a wellbore. The illustrated truth table 200 includes classifications for fluid properties (e.g., oil, gas, and water) based on one or more characteristics that may be determined, at least in part, by sensors utilized with a downhole tool, such as the tool 102 including the segments 118.

In this example, respective phases 202, 204, 206 correspond to gas, water, and oil, respectively. Characteristics determined by the sensors for these phases 202, 204, 206 are then measured against different properties determined, at least in part, using the one or more sensors in order to classify the wellbore fluid. In this example, a first characteristic 208 in the table 200 corresponds to fluorescence. By way of example, fluorescence may be measured using one or more sensors, such as an optical sensor. In the illustrated embodiment, respective fluid characteristics 210 are shown in the row corresponding to the first characteristic 208 for each of the potential phases 202, 204, 206. In various embodiments, a fluorescence of approximately zero may be indicative of either gas or water, while fluorescence of approximately one may be indicative of oil. The table 200 illustrate such a configuration by illustrating the value of 0 in the gas 202 and water phases 204 corresponding to a determination of "N" for no, in contrast to the value of 1 in the oil phase 206 corresponding to a determination of "Y" for yes. It should be appreciated that, in various embodiments, intensity (I) for determination of fluorescence may be determined using one or more of Equations 1-3:

$$I_{gas} = \alpha I_{0\lambda 1} + \beta I_{0\lambda 2} + \phi I_{0\lambda f}; \ \alpha \& \beta = 1, \ \phi = 0 \quad (1)$$

$$I_{oil} = \alpha I_{0\lambda 1} + \beta I_{0\lambda 2} + \phi I_{0\lambda f}; \ \alpha \& \beta \sim 0, \ \phi = 1 \quad (2)$$

$$I_{water} = \alpha I_{0\lambda 1} + \beta I_{0\lambda 2} + \phi I_{0\lambda f}; \ \alpha \& \beta = X\%, \ \phi = 0 \quad (3)$$

Further illustrated in the table 200 are relationships formulated by evaluating refractive indexes at different wavelengths, as illustrated at second characteristic 212 and third characteristic 214. It should be appreciated that the different wavelengths may correspond to different colors of light with one or more sensors. Furthermore, as will be described below, additional measurements may also be utilized to provide an indication of certain fluid properties. In the example of table 200, refractive indexes (RI) for each wavelength are evaluated to determine whether the phase is gas or water (e.g., where fluorescence is 0). By way of example only, in configurations where RI for the wavelengths $0.9I_0$ and fluorescence is 0, then "Y" is indicated for gas. In contrast, RI of ½ of gas and fluorescence of 0 has a "Y" for water. Accordingly, these additional relationships may be utilized for a determination between gas and water where fluorescence is 0. Embodiments presented herein will further represent the signal response which may be utilized to populate the table 200.

It should be appreciated that additional data may be used in order to generate additional relationships between data. For example, in various embodiments, a resonator described above may be utilized. For simplicity, details of the resonator will not be described herein, but features may be similar to those described in U.S. patent application Ser. Nos. 16/051,022, 16/730,729, and 16/730,739, the full disclosures of each hereby incorporated by reference. Utilizing the density information, which may be gathered from the resonator, as well as sonic speed, impedance, or viscosity, may further improve classification of fluid phases, as well as potential emulsion detection.

Figure 3:
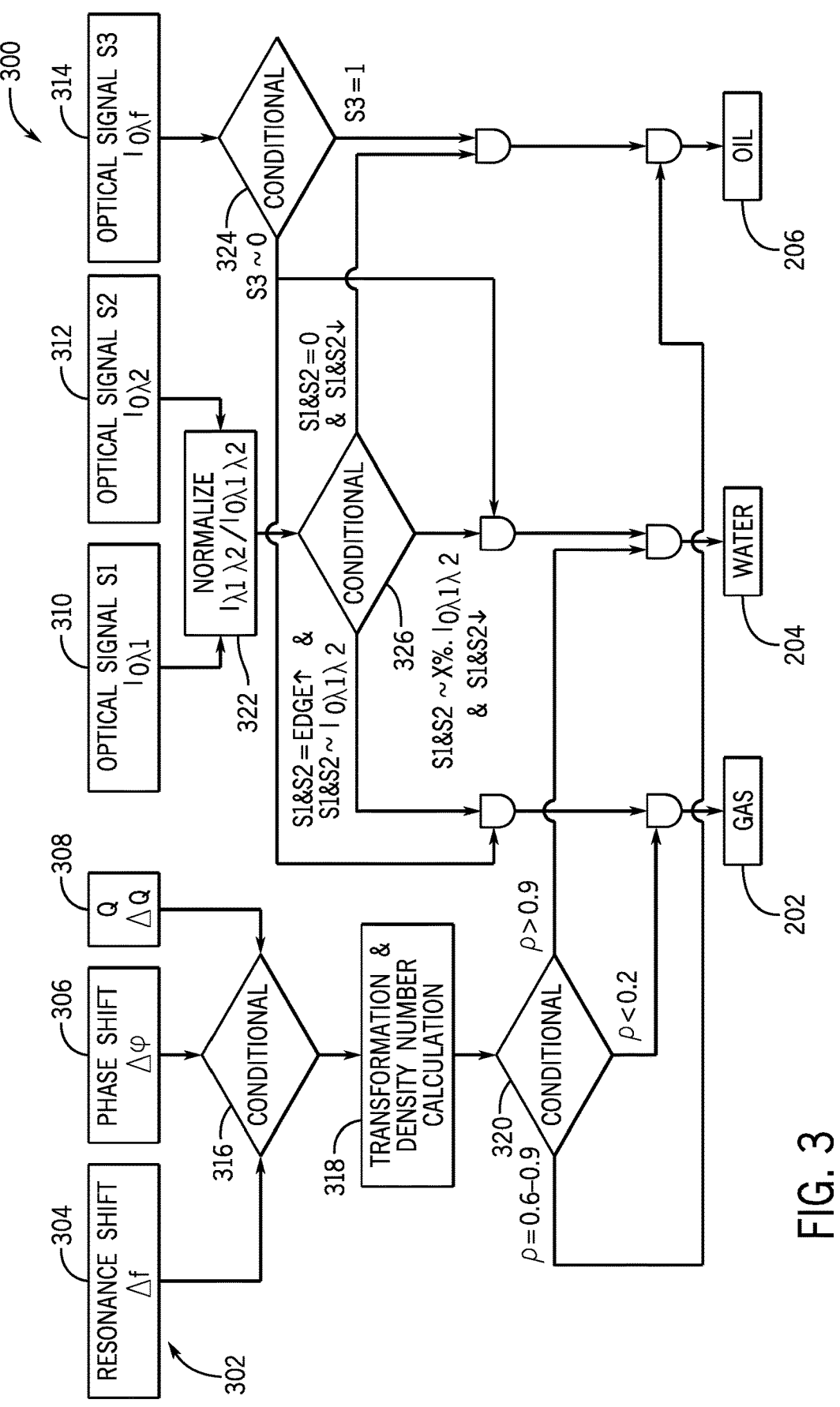
FIG. 3 is a diagram of an embodiment of a decision tree for classifying flow, in accordance with embodiments of the present disclosure.

FIG. 3 is a representation of a decision tree 300 that may be utilized with embodiments of the present disclosure in order to classify phases of fluid flow in a wellbore. In the illustrated embodiment, the inputs 302 are directed toward a resonance shift 304 (Δf), a phase shift 306 (Δφ), and a Q factor 308 (ΔQ), which may be obtained from the resonator (described above). Moreover, an optical signal S1 310 ($I_{0\lambda 1}$), an optical signal S2 312 ($I_{0\lambda 2}$), and an optical signal S3 314 ($I_{0\lambda f}$) may be obtained from one or more optical sensors, for example fluorescence sensors or refractive index sensors. In various embodiments, one or more of the optical sensors may utilize different color light. It should be appreciated that, in certain embodiments, the decision tree 300 may also be utilized to populate or be used in conjunction with the table 200.

Turning to the measurements obtained from the resonator, each of the values 304, 306, 308 may be fed to a conditional block 316, which may process or analyze the information in order to obtain a density calculation 318. It should be appreciated that various processes may be utilized to obtain the density calculation, such as transformations, phase shifts, and the like. Turning to a second conditional 320, different density ranges may be evaluated for processing with information from the one or more optical sensors (e.g., signals 310, 312, 314). For example, different density ranges may be utilized as triggers or thresholds to evaluate different criteria. For example, a density greater than approximately 0.9 may lead to an add gate which is representative of the water phase 204. Similarly, a density less than approximately 0.2 may be indicative of a gas phase while a density between 0.6 and 0.9 may be indicative of an oil phase or emulsion. It should be appreciated that these ranges are for illustrative purposes only and may change given the formation properties, expected composition, and the like. Furthermore, data may be utilized to train or otherwise inform the threshold divisions. For example, historical data for a given field or region may be fed into a machine learning system to process information to determine various associated properties for different phases of flow and/or compositions.

The decision tree further includes the region from the optical sensors described above. In the illustrated embodiment, the optical signal S1 310 and the optical signal S2 312 may be normalized 322 while the optical signal S3 314 is evaluated at a conditional 324 to determine whether or not the fluorescence is equal to approximately 0 or 1, as described above. A measurement of approximately 1 is indicative of oil while a measurement of approximately zero is indicative of either gas or oil, in the illustrated embodiment. The normalized optical sensors may also be evaluated by the conditional 326 illustrated in FIG. 3. As shown, various resultant calculations may direct the tree along different paths. Accordingly, different values lead to various add gates, which may then be utilized to determine a phase of flow.

Figure 4:
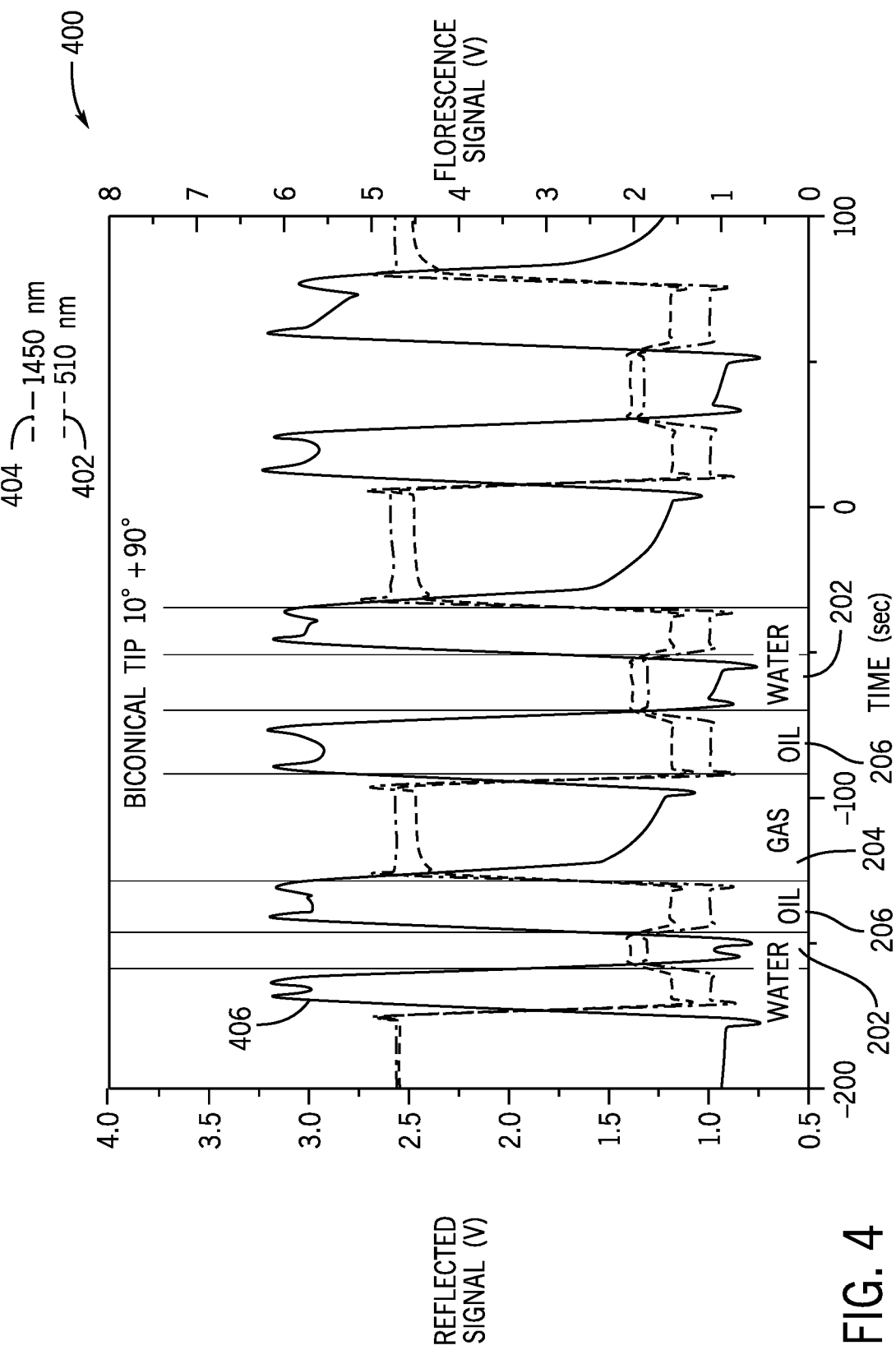
FIG. 4 is a graphical representation of an embodiment of an optical response, in accordance with embodiments of the present disclosure.

FIG. 4 is a graphical representation 400 of an optical response illustrating a reflected signals 402, 404 at different wavelengths and a fluorescence signal 406. As noted above, the different wavelengths may be representative of different colors of light. In operation, reflected light intensity will vary with fluid type, for example based on the refractive index of the fluid. Furthermore, fluorescence emissions may be present with oils due to asphentene. In this example, water phases 202, gas phases 204, and oil phases 206 are marked. As can be seen, and also described in table 200, the presence of fluorescence is indicative of the oil phase 206. However, further evaluation is performed to distinguish between the water phases 202 and the gas phases 204. In this example, it can be seen that the reflected signal is greater in the gas phase 204 than the water phase 202. As noted above, in various embodiments, the reflected signal in the water phase 202 may be approximately one half of the reflected signal in the gas phase 204. Accordingly, various embodiments may utilize optical signal data for fluid phase analysis.

Figure 5A:
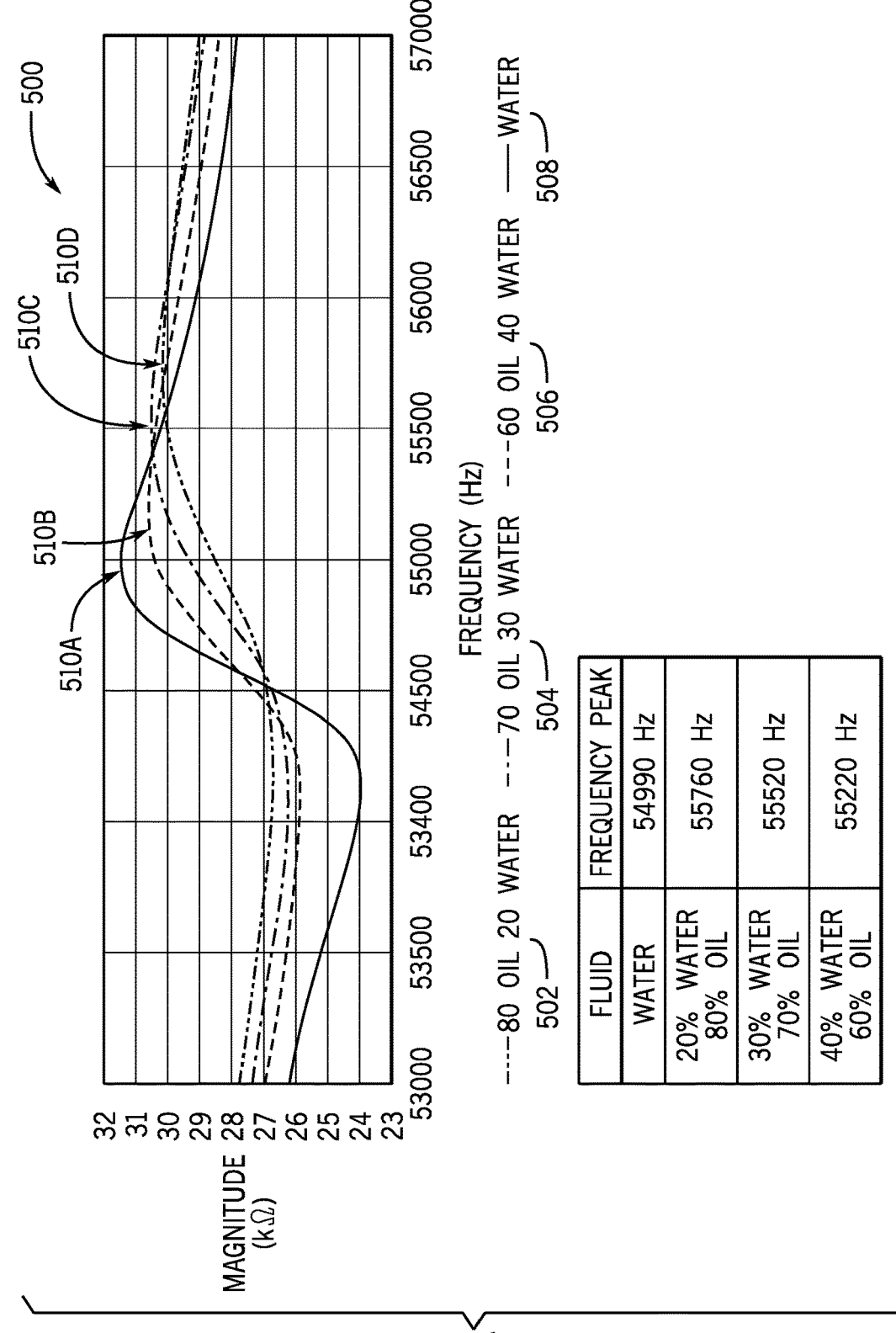
FIGS. 5A-6B are graphical representations of impedance responses of emulsions, in accordance with embodiments of the present disclosure.
Figure 5B:
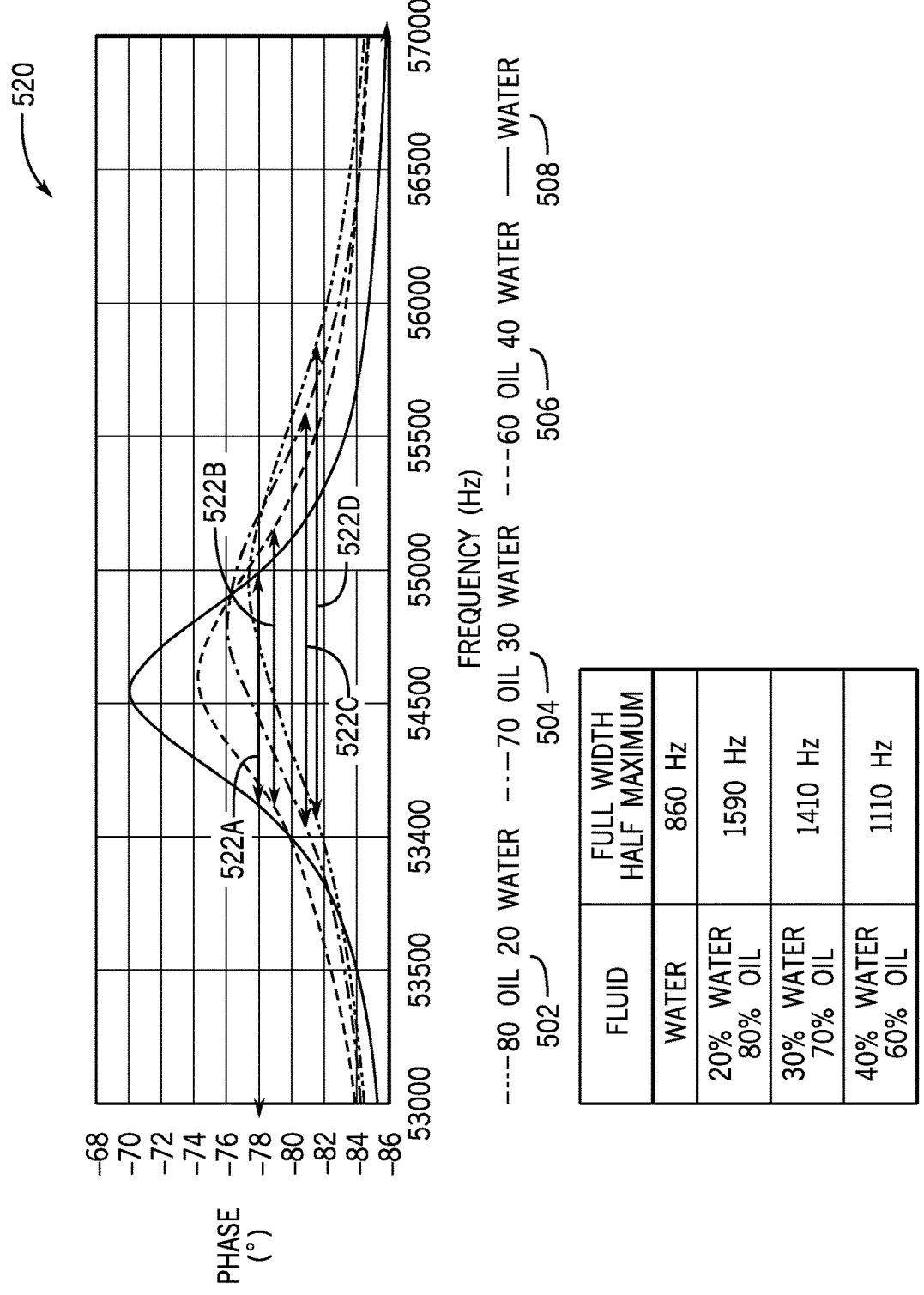

FIGS. 5A and 5B are graphical representations 500, 520 of impedance measurements that may be obtained from downhole tools, such as resonators. In this example, the representation 500 corresponds to a magnitude of the impedance and the representation 520 corresponds to a phase of the impedance. As will be known by one skilled in the art, impedance is a complex number, and as a result includes multiple response curves.

Turning to the representation 500, examples of four different fluids are provided to illustrate difference frequency peak responses. In this example, a first fluid 502 corresponds to an 80/20 oil/water mixed emulsion, a second fluid 504 corresponds to a 70/30 oil/water mixed emulsion, a third fluid 506 correspond to a 60/40 oil/water mixed emulsion, and a fourth fluid 508 corresponds to water. As shown in the representation, respective peaks 510A-D vary based on the percentages of oil/water in the fluids. In this example, more water leads to a higher peaks 510.

With respect to FIG. 5B, the graphical representation 520 illustrates the fluids 502-508 and respective full width half maximums (FWHM) 522A-D. In this example, FWHM increases as oil quantity increases. In other words, emulsion viscosity is higher than the viscosity of oil or water alone, as illustrated by the dampened phase response. Accordingly, embodiments of the present disclosure may utilize this determination in order to identify the presence of an emulsion.

Figure 6A:
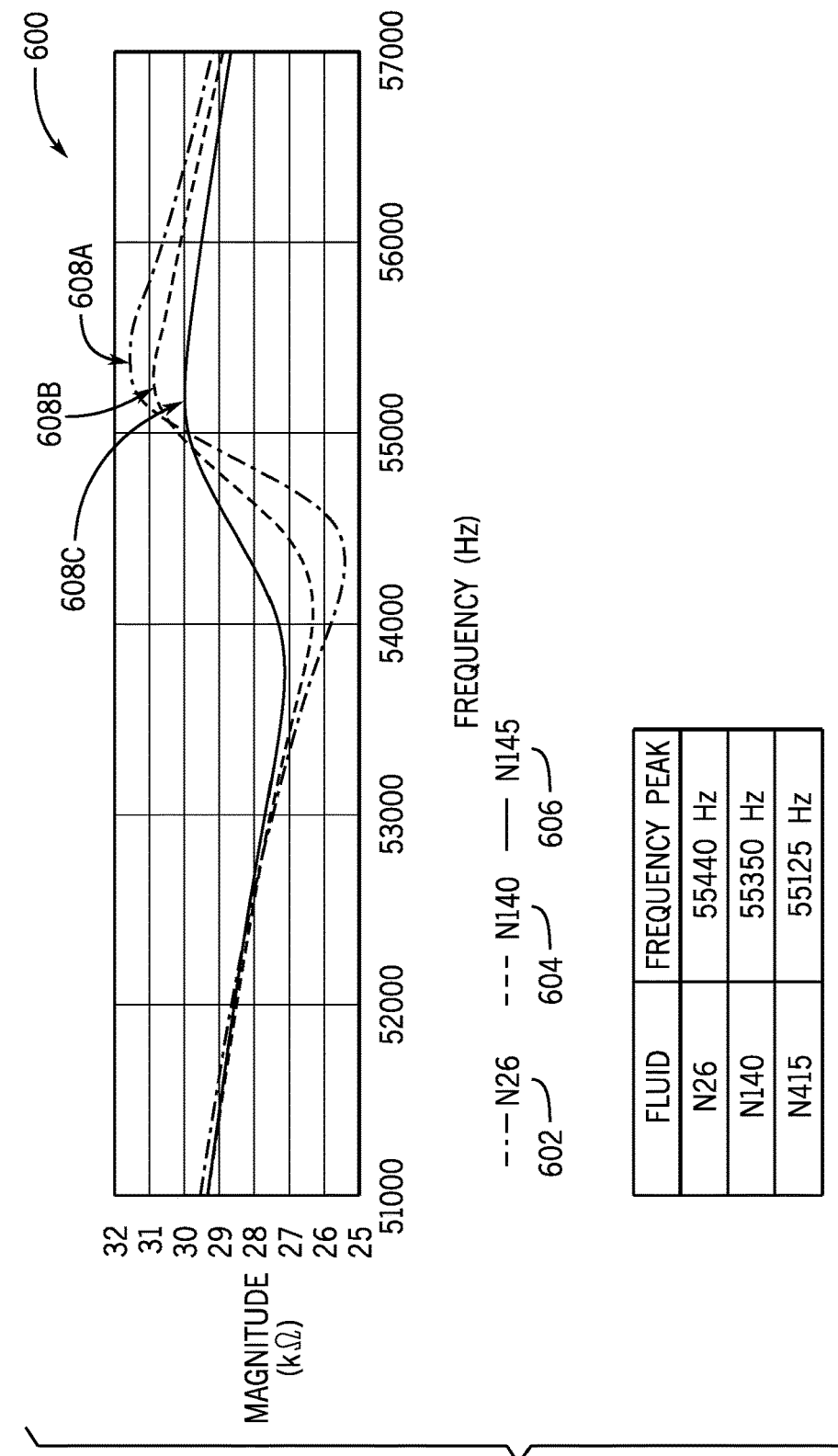
Figure 6B:
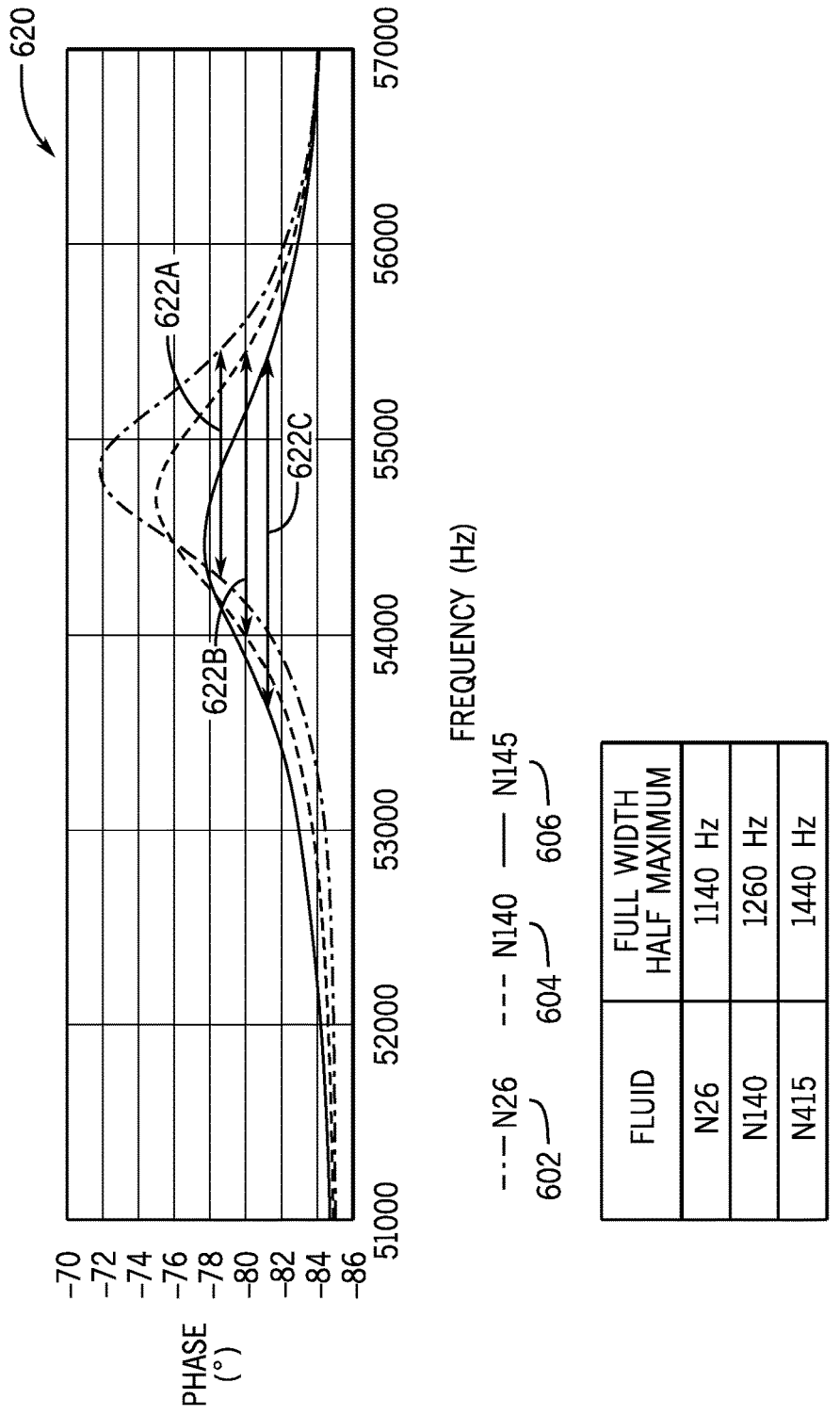

FIGS. 6A and 6B are graphical representations 600, 620 of impedance measurements that may be obtained from downhole tools, such as resonators. In this example, the representation 600 corresponds to a magnitude of the impedance and the representation 620 corresponds to a phase of the impedance. Similar to the embodiments shown in FIGS. 5A and 5B, the representations 600, 620 illustrate peak frequencies and FWHM for calibration fluids 602-606. In this example, the fluid 602 corresponds to N26, the fluid 604 correspond to N140, and the fluid 606 corresponds to N415. It should be appreciated that these fluids have a density range from 0.8210 g/cc and 0.8457 g/cc at 20 degrees Celsius and a viscosity range from 49.52 cP to 1164 cP at 20 degrees Celsius, as shown in Table 1.

TABLE 1

| Fluid Properties of N26, N140, and N415 | | |
|---|---|---|
| Fluid | Density (g/cm³) | Viscosity (cP) |
| N26 | 0.8210 | 49.52 |
| N140 | 0.8376 | 337.20 |
| N415 | 0.8457 | 1164 |

As shown in FIG. 6A, peaks 608A-C are illustrated to show that peaks are greater for lower density fluids. Additionally, as noted above, FIG. 6B illustrates the FWHMs 622A-C that increase as viscosity increases.

Figure 7:
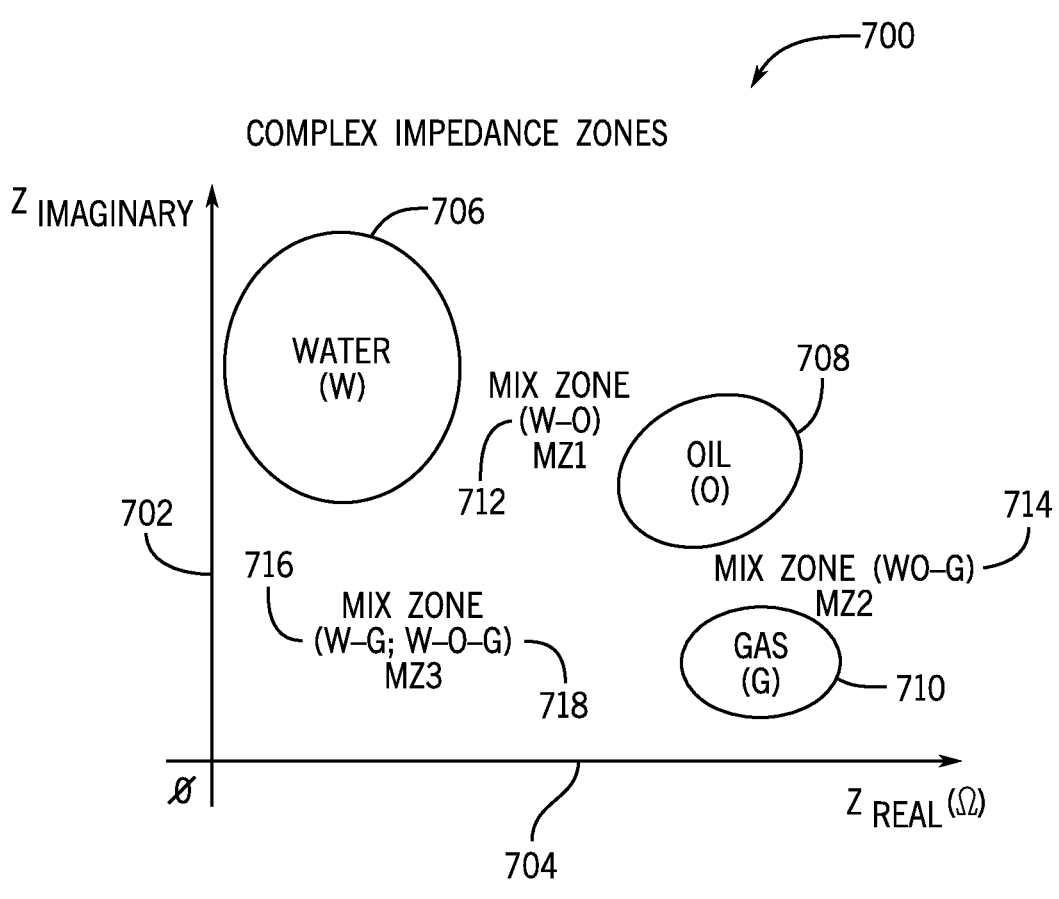
FIG. 7 is a graphical representation of an embodiment of complex impedance zones, in accordance with embodiments of the present disclosure.

FIG. 7 is a graphical representation 700 of complex impedance zones that may be utilized to detect phases of fluid flow in wellbores, among other applications. It should be appreciated that, when describing zones of flow that the phase may be a gas zone, a water zone, an oil zone, an oil-gas mixture zone, an oil-water mixture zone, water-gas mixture zone, or an oil-water-gas mixture zone. Accordingly, there may be zones that are substantially all gas or all water, while also including mixed zones. In the illustrated embodiment, the graph 700 represents complex impedance at a particular frequency having the imaginary components on a y-axis 702 and the real components on an x-axis 704. As illustrated, a water zone, an oil zone, and a gas zone are arranged within the graph with intermediate mixed zones, as described above.

In various embodiments, the complex impedance may be obtained from electrodes exposed to or coupled through an engineered passivation and protective (e.g. against corrosion, abrasion, chemical reaction, wear, etc.) isolation layer to the fluid through a thin isolation layer characterized and compensated to compute and obtain the fluid complex impedance. This complex impedance diagram has various zones: Water-W 706, Oil-O 708, Gas-G 710, mixed O-W 712, mixed O-G 714, mixed W-G 716, and mixed O-W-G 718. These zones are identified for different fluids and mixes (i.e. oil, gas, water, mix of theses fluids with two and three phases) where the measured complex impedance may be located.

In various embodiments, a given reservoir has connate water with a virgin undisturbed resistivity (Rw). The complex impedance of the 3-phase fluid varies with frequency and the discussion may be constrained to the low frequency range. FIG. 7 describes three-phase fluid mixes involving water (Water-oil or W-O, water gas mist or W-G, water-gas-oil or W-G-O). Water (high relative Epsilon around 90) in a reservoir can have a range of resistivity from brine to fresh water, both with a higher complex resistivity component value (top region of the graph). As illustrated, oil has a relative epsilon around 6 to 8. Gas has a very low relative epsilon around 1. In various embodiments, the complex component value of the 3-phase fluid complex impedance is proportional to the effective relative epsilon of the overall three-phase fluid mix according to the well-known mixing laws at a given measurement frequency.

When oil mixes with water, the real resistivity component of the total mix complex impedance will vary proportionally based on the water resistivity (Rw). In other words, the real component will move to the left region in the graph for conductive brine water or to the right region in the graph for conductive fresh water. The complex component of the mix will increase (e.g., move to a higher region up in the graph) as the mixing water has a much higher relative epsilon. As a mist mix of water and gas (i.e. W-G) is formed, its total complex impedance value will vary accordingly in the 2-D complex impedance plane. The real component of the water-gas mist mix complex impedance will lower (e.g., move to the left region of the graph) as the water resistivity is lower (towards brine levels) and as the water volume percentage becomes higher. Accordingly, as the water volume percentage in the water-gas mist is increased, the complex component of the complex impedance will rise as the water has a relative epsilon much higher than gas.

Once the complex impedance of each of the three-phase, two-phase, or single-phase fluid components being produced from a reservoir completion inlet location is known, the mixing laws equations may be established to determine or limit the set of three-phase fluid individual percentage volume mixes (e.g., single-phase, two-phase, and three-phase fluid flow) that will correspond to the apparent complex resistivity measured. If there are remaining ambiguities in the analysis, the fluid mix volumes can be further resolved with additional measurements obtained from a mechanical resonator with sensitivity to the fluid density, viscosity, and sonic speed to further resolve the fluid mix component percentages.

FIGS. 8A-8D illustrate spider web diagrams with viscosity, density, and fluid sonic speed as ternary coordinates generating a triangular pattern that can be used to cross-correlate to a particular fluid and integrated to the data fusion method. Measurements for these features may be obtained from the resonator described above. FIG. 8A corresponds to a general representation 800 of the diagram including the three-axis coordinates corresponding to viscosity 802, density 804, and fluid sonic speed 806. As illustrated, different phases may have different patterns, such as the illustrated water pattern 808 (FIG. 8B), oil pattern 810 (FIG. 8C), and gas pattern 812 (FIG. 8D). It should be appreciated that, in various embodiments, such a spider web diagram may be utilized with pattern recognition or the like to quickly identify various phases of flow. For example, a machine learning system may be trained with different patterns or images corresponding to various phases of flow. This data may be considered as ground truth data that is used for further pattern or image recognition with new information, for example using a neural network such as a convolutional neural network. Image information corresponding to the web diagrams may be presented to the trained machine learning system at various times throughout a logging process and changes may be labeled to correspond to a given time, thereby providing a real or near-real time analysis of a fluid phase during wellbore operations. It should be appreciated that the trained system may be referred to as a machine learning module, which may include both hardware and software components, such as a graphics processing unit (GPU) executing instructions stored on a memory (e.g., non-transitory machine readable memory).

Figure 9:
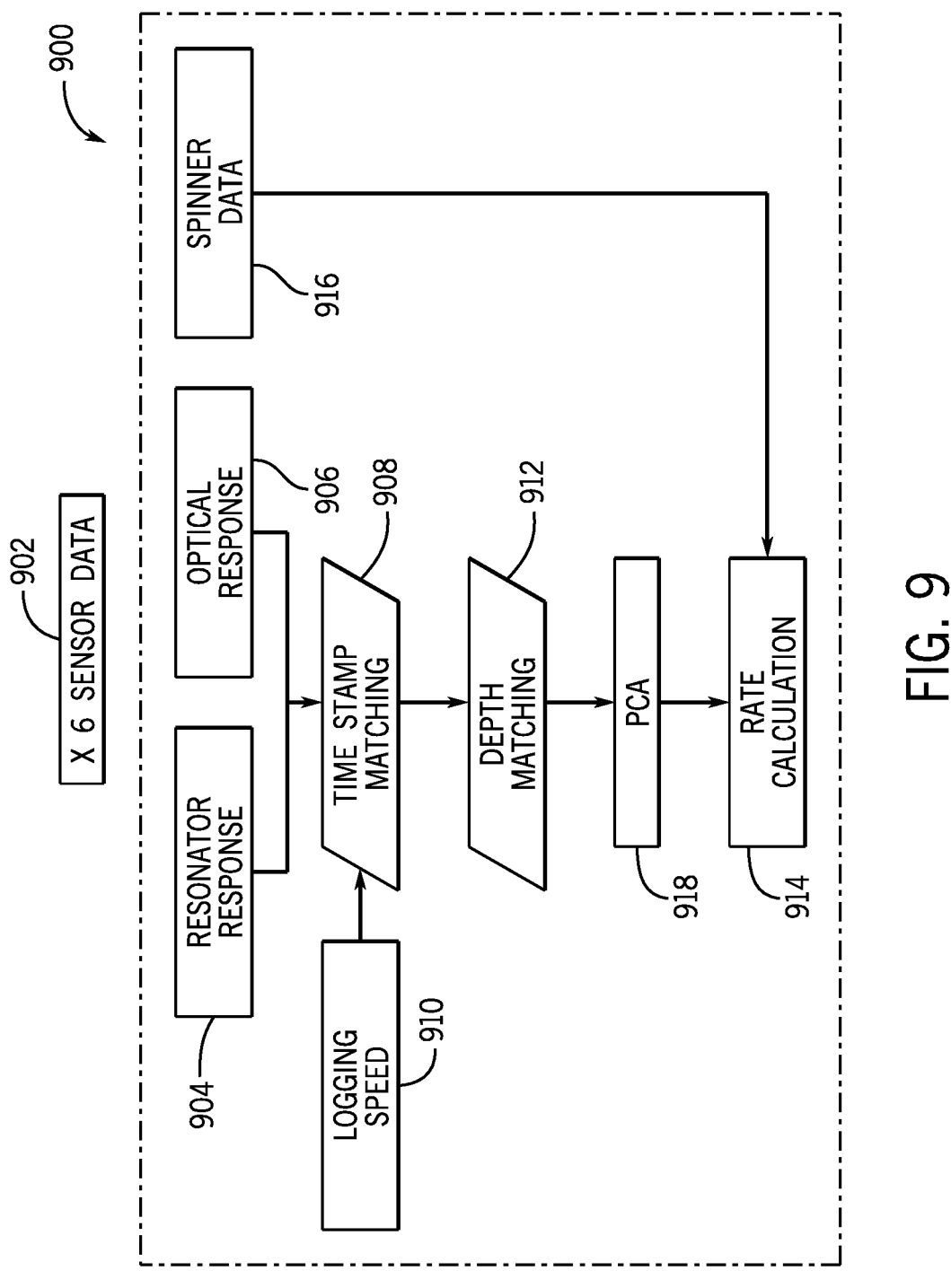
FIG. 9 is a process flow diagram of an embodiment for classifying flow, in accordance with embodiments of the present disclosure.

FIG. 9 is a flow diagram of a post processing system 900. It should be appreciated that various steps may be performed in a different order, or in parallel, unless otherwise specific stated. Furthermore, there may be more or fewer steps. In this example, sensor data is obtained 902, which may come from an array of sensors. It should be appreciated that data from 6 sensors, as shown in FIG. 9, is for illustrative purposes only and there may be more or less sensor data. Furthermore, as noted below, it should be appreciated that the sensors may include different types of sensors, such as resonators, optical sensors, and the like, as described above. In various embodiments, an array of sensors may be positioned at different circumferential and radial positions of the wellbore in order to obtain a slice or cross-sectional representation of the flow through the wellbore over time. In the illustrated embodiment, information from the resonator 904 (e.g., density, viscosity, etc.) and the optical sensors 906 (e.g., reflective index, fluorescence, etc.) may be utilized in order to from the three-dimensional image. For example, information may be logged at a particular time 908 along with a logging speed 910. This information may be matched against depth data 912, which may be provided by one or more other sensors, and processed with mass flow rate data 914, which may, for example, by obtained by a spinner 916 or some other sensor arranged within the wellbore. As a result, information may be provided to generate a 2-dimensional cross-section slice fluid phases quantitative measurement and qualitative assessment of the wellbore's fluid flow to identify different phases or phase mixes including emulsion detection 918 and its volumetric quantification at different depths of the well, as well as different radial or circumferential positions within the well.

Accordingly, various embodiments enable 3-phase and emulsion well fluids volumetric reservoir well production data. The various measurements at a sensor can be placed in the 2-Dimensional complex impedance (real and imaginary impedance components) plots as shown in FIG. 7 and the 3-dimensional ternary plot (Spider chart) of viscosity, density and sonic speed defining a triangle shape for each fluid measurement as shown in FIGS. 8A-8D. In each of the plots for each time interval, well depth or sensor location from an array of sensors can be statistically clustered with known algorithms and methods and each cluster be associated. The clusters within a spatial volume or time interval of interest can be developed with similarity measures of sequential patterns in the 2-dimensional complex impedance plane shown in FIG. 7 or the 3-dimensional coordinate ternary system's triangular graphs shown in FIGS. 8A-8D. Similarity measures can be used not only to identify, form, and delineate these clusters (i.e. 2-dimensional regions and 3-dimensional triangle graph patterns discussed above) but also be jointly co-related by graph proximity and geometric numerical similarity measures to a database's reference catalog items associated with a particular fluid or emulsion or a mix of fluids and emulsions. Well-known reservoirs production logs, corresponding lab fluid flow characterization, and calibration measurement data form this reference well fluid production database. This database's acquired data may include clusters of geometric and graph patterns, clustered 2D and 3D distributions of multi-physics measurements (e.g. fluid properties, electrical complex impedance), and multiple fluid property and flow measurements. These database measurements may be associated to enable improved resolution of fluid flow regimes, producing a more robust, accurate and reliable volumetric assessment and measurement of real-time three-phase and emulsions production flow. Each individual phase and emulsion flow volume jointly produced in certain zones or in certain well completion sectors of the reservoir's producing wells may be identified and volumetrically quantified with more accuracy and reliability, helping reservoir management to avoid losses to emulsion formation within the production flow for example.

Figure 10:
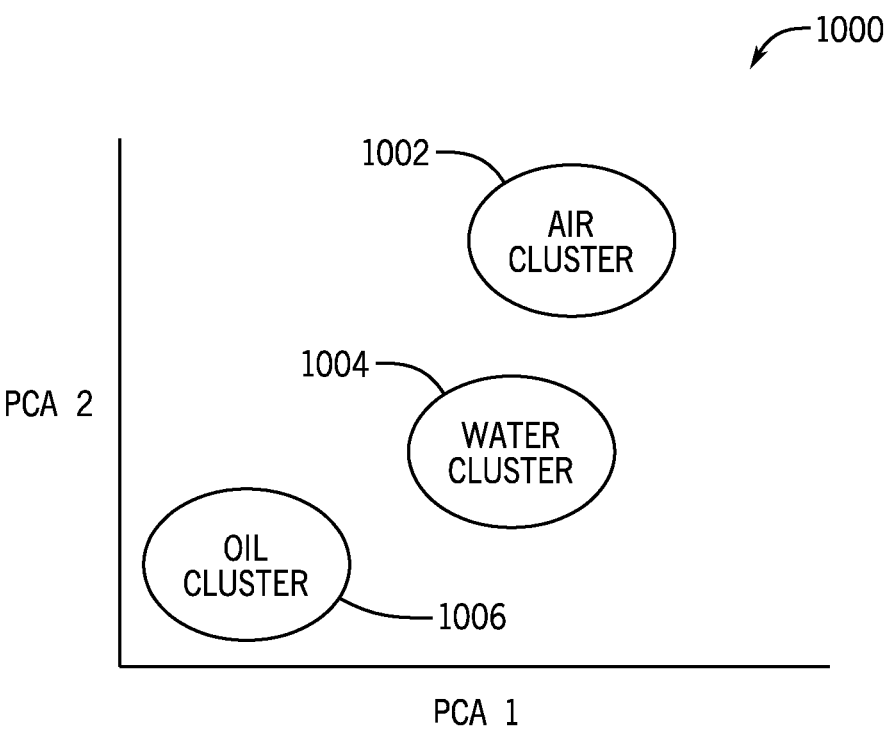
FIG. 10 is a graphical representation of an embodiment of a clusters for classifying flow, in accordance with embodiments of the present disclosure.

As described above, cluster data may be obtained from a variety of sensor data. As a result, different clusters of phases may be identified, as well as intermediate mixed areas of flow, as described above. FIG. 10 illustrates a representation 1000 of a principal component analysis utilizing information from the sensor data and resonance data, as discussed above. For example, in this example, different clusters 1002, 1004, 1006 are generated after the principal component analysis, for example as noted with respect to FIG. 9. Accordingly, data falling within these predetermined regions, which may be generated using machine learning systems to analyze various formations to identify the ranges for different clusters, may be quickly and accurately categorized.

In embodiments, some (e.g., one or more) of the fluid production flow logging services' objectives are to perform multiple simultaneous measurements, preferably, but not necessarily, collocated, of fluid across a fluid flow path cross-section. Based on these measurements, processors executing instructions stored on memory may evaluate the fluid flow volumes, characteristics, flow rates, flow time-domain pattern sequences, and the like.

The measurements described herewith consist of multi-physics measurements providing multiple, independent evaluations with a variation of degrees of measurement accuracy, resolution, sensitivity, uncertainty, signal to noise, measurements processing methodology, real-time processing, speed, dynamic range, 3-phase fluid flow, type identification and evaluation, and the like. Each measurement is based on a given physics phenomena with limitations and advantages that can vary dynamically with the fluid flow sequences and fluid types exposed to the respective sensors over time and over a spatially sampled space. The fusion of different measurement observations of the same fluid volume flow exposed to the closely collocated sensors can greatly benefit from an integrated multi-physics statistical decision support model, fluid analysis methodology and decision theory support system to produce optimal decisions on what the fluid flow volume observed is estimated to be. The decision process fusing various multi-physics sensors produces a robust and reliable evaluation choice of the three-phase, two-phase, or single-phase fluid flow measured with a time-series and time-domain pattern of observations spatially distributed across the fluid flow cross-section.

Each primary sensor measurement alone independently has associated a fluid evaluation and identification decision probability uncertainty, an interpretation probability, measurement variance, and limited range based on its measurement level and characteristics. This measurement probability can be computed in a decision model process to make a measurement evaluation choice to determine an estimate of the fluid flow volumes and phases.

The multi-phase fluid flow characterization summary, the volumetric distribution flow and fluid phase surface interfaces time motion, and respective 3-D spatial reconstruction based on multiple sensor observations optimally placed along the fluid flow path can be seen as inverse problem with corresponding error, noise, accuracy, and probabilistic distributions models. The multi-physics and multivariate fluid multi-phase flow inversion problem becomes more challenging as the sensor's responses to the observed physical properties have non-linear dependencies. These inverse problems can often be ill-posed problems (i.e. its solution might not be conversion stable or might not be unique). The inversion problem deterministic inversion solution approaches, like the steepest descent, nonlinear conjugate gradient, and Gauss-Newton method, are widely applied to downhole logging problems. The main drawback of the deterministic approach is that derivatives contain only local properties of the objective function and consequently the solution optimization process could converge to a local minima point. Production log data interpretation solving can benefit from regularization knowing that prior information such as known producing well fluid properties could be available but with limited representation with rigorous mathematical forms. Fluid properties might be available for each phase being produced from well producing zones and could be available as a priori information to assist in solving multi-variate problem with missing laws equations specially when there are two or more mixed phases measured in the observed flow under evaluation.

Production Logging Data interpretation can be driven by linearization or truncated polynomial approximations simplifications treated as an inversion problem approach applied to complex multivariate multi-physics non-linear problems. Solutions to these problems can utilize a truncated Taylor expansion series and its coefficients to simplify sensors' non-linear responses. The efficiency of production logging interpretation inversion problem involving multi-variate and multi-physics mathematical equations are potentially accelerated with techniques such as Supervised Descent Learning Technique (SDLT) and Supervised Descent Method (SDM) to optimize the objective function solutions. Both SDLT and SDM solving inversion approaches use both the data driven learned descent direction and the physical modeling (e.g., numerical or physical lab simulations) simultaneously to guide production flow model reconstruction thus balancing speed, accuracy, and solution broad generalization. The learning can be applied to training datasets acquired with a controlled environment and conditions simulated with well production flow-loop or numerically derived cases with validated noise models.

Considering other collocated or nearby sensor(s) and/or raw measurement separately acquired at a given time or time interval with different physics or characteristics offers additional fluid flow information synchronously and simultaneously (or near-simultaneously) obtained, the primary sensor's decision model certainty probability will have higher confidence level, improved reliability and robustness and its decision model input probability dependent on these additional measurements and also on processed measurements.

With the consideration of other collocated sensors, spatially distributed along the fluid flow cross-section, and separately acquired at a time or time interval simultaneously and synchronously providing a combined measurements' pattern for the fluid evaluation decision model to enhance the primary sensor's data evaluation based on conditional probability dependent on other measurements and their evaluations resulting in an estimate with higher confidence level, improved reliability and robustness and its decision model input probability dependent on these additional measurements and also on processed measurements.

The fluid flow state is evaluated based on a probabilistic decision theory methodology that is tailored to resolve optimally based on a pre-established success criteria for the dynamic fluid flow in a one-phase, two-phase, and three-phase flow consisting of water, gas and oil phases, but also resolve condensate, emulsions or transition interface mixed volumes of any combination of these fluid flow components.

In embodiments of the present disclosure, a fluid flow evaluated state is formed by state variables composed by the collection of each one of the primary sensor unit's evaluation state, which is determined based on a decision model support for probabilistic inference with weighted probabilities associated with measurements made with collocated sensors and other spatially distributed sensors producing a multi-dimensional variable state decision choice. The primary sensors evaluation decision model probabilities are also dependent on their measurements level and their statistical characteristics exhibited in the time frame relevant to the decision process. The fluid flow multi-dimensional variable state is based on independent multiple-physics measurements and some sensor variations within the same physics class.

Another probabilistic dependence of the future fluid flow's evaluated state depends on previous and concurrent measurements time-domain series including previous fluid flow evaluated states based on measurements and a probabilistic decision model for best state choice evaluation. This probabilistic dependence is based, at least in part, on one or more separate concurrent state variable measurements.

The probability multivariable and multi-state dependence is described by the Bayesian inference theory (P [A|B]) or similar and equivalents techniques used to construct the decision theory where the probability of variable state A occurring is dependent on the value of variable state B (previous and/or concurrent values) or a multi-dimensional pre-conditioning collection of state variables Bn (previous and/or concurrent values) with correlated probabilistic relationships.

The decision theory can also be tailored to support flow analytical decision process identifying fluid flow volume clusters (laminar or not), heterogeneous fluid interface transitions clusters using probabilistic distributions based on multi-dimensional state variable similarity and conversely based on variation and dissimilarity.

The decision theory operational model for fluid flow multi-dimensional state variable for fluid flow volume identification and characterization with clusters delineation lends itself for the application of machine learning methodologies and techniques based on decision theory, probabilistic distributions and relationships and probability functions of the Bayesian inference type as described above. Some classes of fluid flow resolution and interpretation can be accomplished and optimized with optimized and streamlined decision theory models and Bayesian Inference Theory type (and other similar variable dependent and co-dependent probabilistic functions) of probabilistic relationships.

Figure 11:
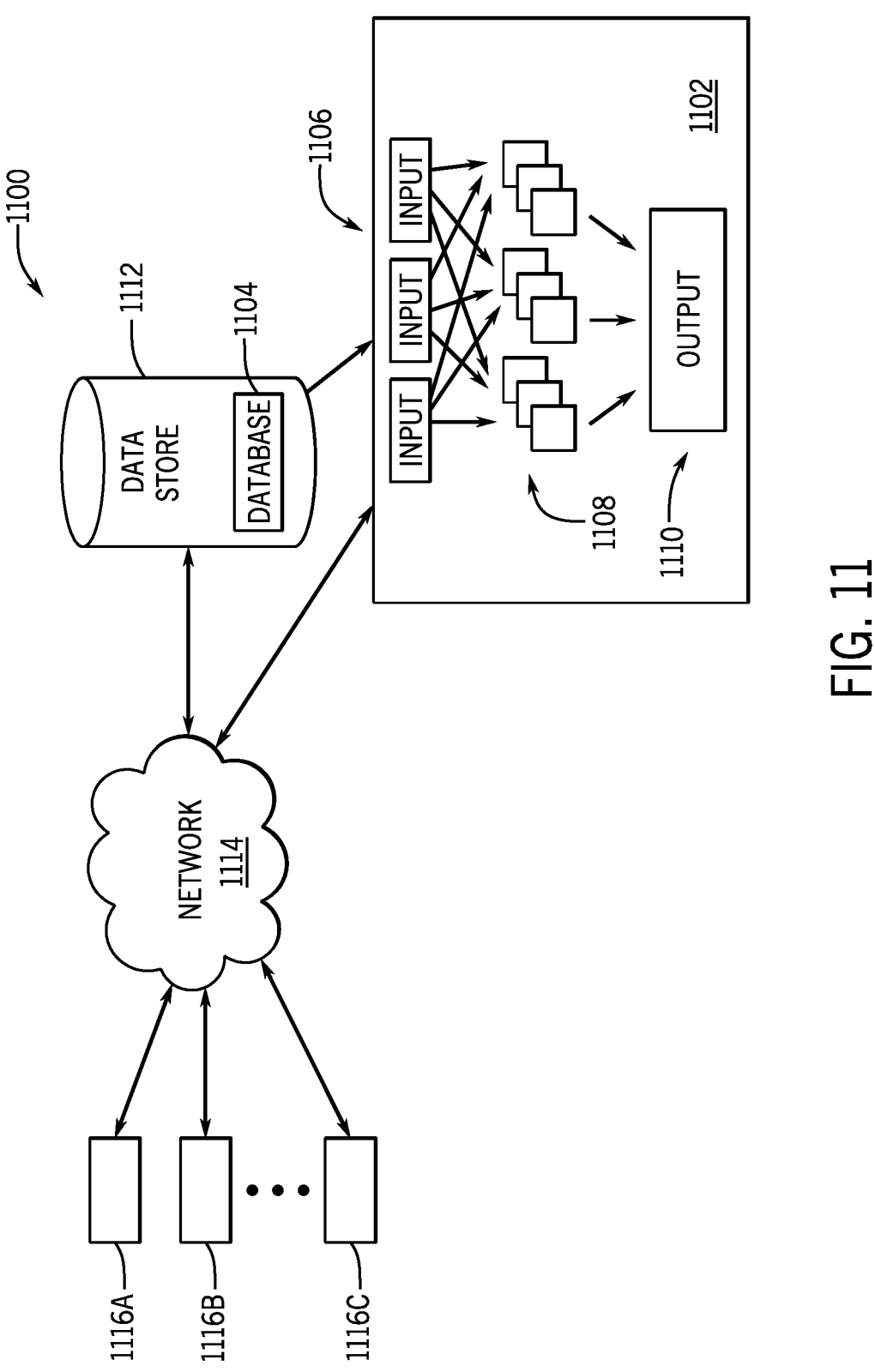
FIG. 11 is a block diagram of an embodiment of a machine learning system, in accordance with embodiments of the present disclosure.

FIG. 11 is a block diagram of an embodiment of a machine learning system 1100 that may be utilized with embodiment of the present disclosure. Embodiments of the present disclosure may utilize machine learning techniques to associate the multi-physics measurements acquired using the one or more sensors in order to determine fluid information, as described above. The machine learning techniques may include one or more neural networks (e.g., convolutional neural networks, fully connected neural networks, recurrent neural networks, etc.) to analyze how data for one or more measurements may relate to ground truth information related to fluid mixture characterization or flow information. In other words, machine learning systems may be utilized with pattern matching techniques in order to identify fluid properties based on one or more measurements acquired by the system. In an example, a fluorescence measurement may be indicative of an oil, and as a result, that may be utilized to weight later measurements, such as an evaluation of an impedance measurement. In other words, various patterns may be determined (e.g., correlations between measurements) as ground truth information, such may then be utilized to operate the machine learning system. As new information is acquired, which may or may not be verified in a supervised learning environment, the model may be updated to improve later determinations. In certain embodiments, the machine learning techniques may incorporate one or more open source machine learning libraries, such as TensorFlow, scikit-learn, Theano, Pylearn2, NuPIC, and the like.

It should be appreciated that in certain embodiments the machine learning system 1100 may be incorporated into a control system associated with a wireline/drilling system. The control system may include one or more processors and memories. The memories may store instructions that, when executed by the processors, perform one or more functions. Additionally, in embodiments, the machine learning system 1100 may be associated with a remote server having a processor (e.g., central processing unit, graphics processing unit, etc.) and a memory. In the illustrated embodiment, the machine learning system 1100 includes a machine learning module 1102 that may be trained using known information (e.g., a ground truth) such as a database 1104. In this training step, the machine learning module 1102 is utilized to correlate data between fluid mixtures and their associated properties, which may be determined by the one or more sensors or similar sensors. It should be appreciated that the machine learning module 1102 may be trained using any variety of methods, such as neural networks, clustering, or any other reasonable methods. Additionally, the module may include hardware and software components, such as a processor that executes instructions stored on a memory (e.g., non-transitory machine-readable memory). Moreover, it should be appreciated that processors may include graphics processing units (GPUs), central processing units (CPUs), or combinations thereof.

Various embodiments may further utilize one or more neural networks that receive input data 1106, process the data at an intermediate stage 1108, such as a convolutional stage with non-linearity, and produce an output 1110. This information may then be stored in a datastore 1112 and used for later process. It should be appreciated that systems and methods described herein may be conducted using remote systems, much as distributed computing units, that are accessible via a network 1114. Accordingly, input data 1116 may be provided for processing to the machine learning module 1102. The module 1102 may utilize a stored library or information, such as a trained network, and then process the data. By way of example only, pattern recognize may be utilized to process information from the spider plots. In embodiments, the output may correspond to phase information for a wellbore fluid.

The sensor multi-physics measurements are acquired with various multi-physic responses such as optics based fluid flow measurements, fluid mechanical resonators (e.g. piezoelectric resonators), complex impedance spectroscopy and other fluid flow sensor response and sensitivity measurements and direct and indirect sensitivity characterization. The multi-physics measurements are independent and when combined across a large spectrum of flow scenarios dealt with multi-variable and multidimensional probabilistic dependence models can reduce greatly uncertainty of the fluid flow description decisions estimates of the actual fluid flow material and volumes.

Accordingly, embodiments of the present disclose may, based on dynamic measurement series statistical criteria, accept a new state denoted by a set of measurements and computed metrics from such measurements of the fluid flow target based on an existing state denoted by a set of concurrent and or previous measurements and computed metrics from such measurements. In other words, dependencies across the system may be based on a physics response, which either contradicts or verifies a previous assumption associated with a determined value. In this manner, the multi-physics model may yield information about the fluid flows that may inform later operations associated with the wellbore.

FIG. 12 is a flow chart of an embodiment of a method 1200 for determining a fluid phase. In this example, first data from a first sensor is received 1202. The first data may correspond to fluid data, such as wellbore fluid. In various embodiments, the first data corresponds to data obtained from a resonator and may be related to density, viscosity, a phase shift, a resonance shift, a quality factor, or the like. Second data may also be received from a second sensor 1204. The second sensor and second data may be different from the first sensor and first data. As an example, the second sensor may be an optical imaging device and second data may include a reflected signal and/or a fluorescence signal.

Based at least in part on the first data, a first fluid property is determined 1206. As an example, resonance data may be utilized to determine a density or viscosity. In various embodiments, the determination may include other systems, such as machine learning systems that evaluate input data against a database of information and, using a trained network, may identify corresponding information to provide the first fluid property. Similarly, second data may also be utilized to determine a second fluid property 1208.

In various embodiments, the determined fluid properties may be evaluated against a threshold or value to facilitate determination of a fluid phase. For example, the first fluid property may be evaluated and determined to correspond to a first predetermined value 1210 while the second fluid property may also be evaluated and determined to correspond to a second predetermined value 1212. Accordingly, a fluid phase may be determined 1214.

Figure 13:
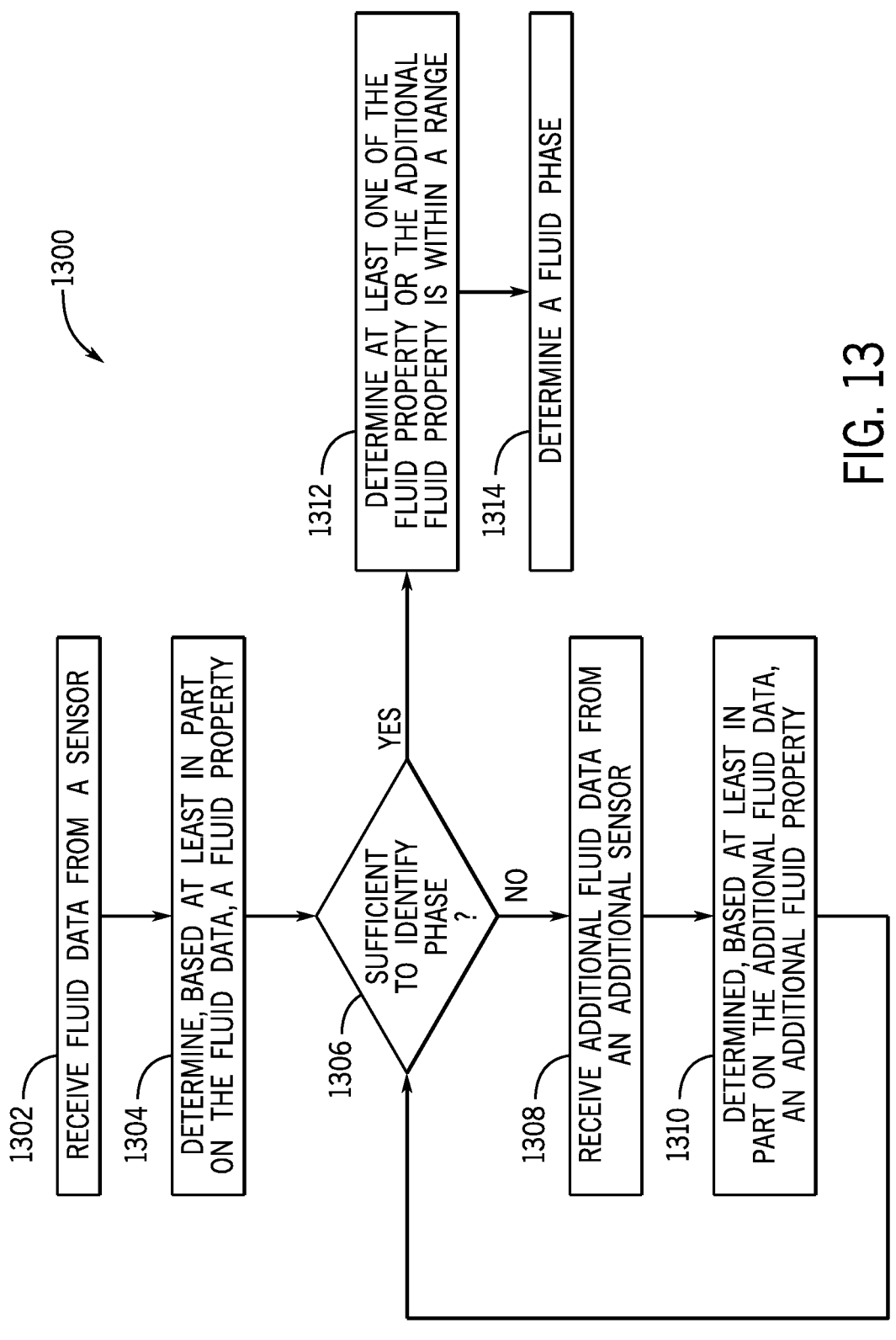
FIG. 13 is a flow chart of an embodiment of a method for classifying a fluid phase, in accordance with embodiments of the present disclosure.

FIG. 13 is a flow chart of an embodiment of a method 1300 for identifying a fluid phase. In this example, fluid data is received from a sensor 1302. Based at least in part on the fluid data, a fluid property is determined 1304. An evaluation is performed to identify whether sufficient information has been obtained to determine a fluid phase 1306. If not, then additional data is received 1308 and an additional fluid property is determined 1310. If there is enough information, then at least one property is evaluated against a range and is determined to fall within the range 1312. As a result, the fluid phase may be determined 1314.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for determining properties of a wellbore fluid, comprising:
  a first sensor configured to determine a first fluid property, the first sensor corresponding to a resonator;
  a second sensor configured to determine a second fluid property, the second sensor corresponding to a first optical sensor operational at a first wavelength;
  a third sensor configured to determine a third fluid property, the third sensor corresponding to a second optical sensor operational at a second wavelength;
  at least one processor; and
  memory storing instructions that, when executed by the processor, cause the system to:
    determine, based at least in part on the first fluid property, a fluid density;
    determine, based at least in part on one of the second sensor or the third sensor, a first fluid fluorescence;
    determine, based at least in part on one of the second sensor or the third sensor, a second fluid fluorescence;
    normalize the first fluid fluorescence and the second fluid fluorescence;
    select an evaluation criteria based on both of a first associated property of the first fluid fluorescence and the second fluid fluorescence and a second associated property of the first fluid fluorescence and the second fluid fluorescence;
    confirm the evaluation criteria based on the fluid density;
    determine, based on the confirmed evaluation criteria, a first phase estimation of the fluid;
    generate based at least in part on the first fluid property, a three-dimensional visual pattern for the wellbore fluid;
    determine, based at least in part on the three-dimensional visual pattern, a second phase estimation of the fluid; and
    determine, based at least in part on the first phase estimation and the second phase estimation, a phase of the fluid.

2. The system of claim 1, wherein the instructions, when executed by the processor, further cause the system to:
  determine the first fluorescence is equal to one;
  determine the fluid density is within an oil range; and
  determine the first phase is an oil phase.

3. The system of claim 1, wherein the instructions, when executed by the processor, further cause the system to:
  determine the first fluorescence is equal to less than one;
  determine the fluid density exceeds a water threshold; and
  determine the first phase is a water phase.

4. The system of claim 1, wherein the instructions, when executed by the processor, further cause the system to:
  determine the first fluorescence is equal to less than one;
  determine the fluid density is less than a gas threshold; and
  determine the first phase is a gas phase.

5. The system of claim 1, further comprising:
  a machine learning system, executed by the processor, the machine learning system being trained by historical wellbore information corresponding to a known fluid phase for given respective known density, fluorescence, and reflection.

6. The system of claim 1, wherein the instructions are executed in real time or near-real time responsive to acquisition from the first sensor, the second sensor, and the third sensor.

7. The system of claim 1, wherein the instructions, when executed by the processor, further cause the system to:
  determine, a fourth fluid property, corresponding to a complex impedance;
  determine a frequency peak of a real component of the complex impedance;
  determine a full width half maximum of an imaginary component of the complex impedance; and
  based at least in part on the frequency peak and the full width half maximum, determine an emulsion characteristic.

8. The system of claim 7, wherein the instructions, when executed by the processor, further cause the system to:
  determine the frequency peak exceeds a frequency threshold; and
  determine the full width half maximum exceeds a width threshold.

9. The system of claim 7, wherein the instructions, when executed by the processor, further cause the system to:
  generate, based at least in part on the frequency peak and the full width half maximum, a plot; and
  determine a zone corresponding to the plot.

10. A method for determining a wellbore fluid phase, comprising:
  receiving, from at least two sensors corresponding to at least a resonator and an optical sensor, fluid data for a fluid flowing through a wellbore;
  determining, based at least in part on the fluid data, a plurality of fluid properties;
  generating, based at least in part on the plurality of fluid properties, a three-dimensional visual pattern for the fluid, the three-dimensional visual pattern including respective axes for each fluid property of the plurality of fluid properties, and wherein at least one of the respective axes has a different exponential scale than at least one other respective axis;
  generating, based at least in part on the plurality of fluid properties, a two-dimensional visual pattern for the fluid including a plurality of zones corresponding to a plurality of characterizations for the fluid; and
  determining, based at least in part on a shape of the three-dimensional visual pattern and a selected characterization, a fluid phase.

11. The method of claim 10, wherein the plurality of fluid properties comprise a fluid density, a fluid viscosity, and a fluid sound speed.

12. The method of claim 10, further comprising:
  training a machine learning system to identify visual patterns corresponding to a respective fluid phase, the machine learning system being trained using at least one of historical data, simulated data, or laboratory generated data.

13. The method of claim 10, wherein the visual pattern is a three-axis spider plot.

14. The method of claim 10, wherein at least a portion of the visual pattern is generated at different locations within the wellbore, based at least in part on tagged logging information.

\* \* \* \* \*